UNITED STATES PATENT OFFICE.

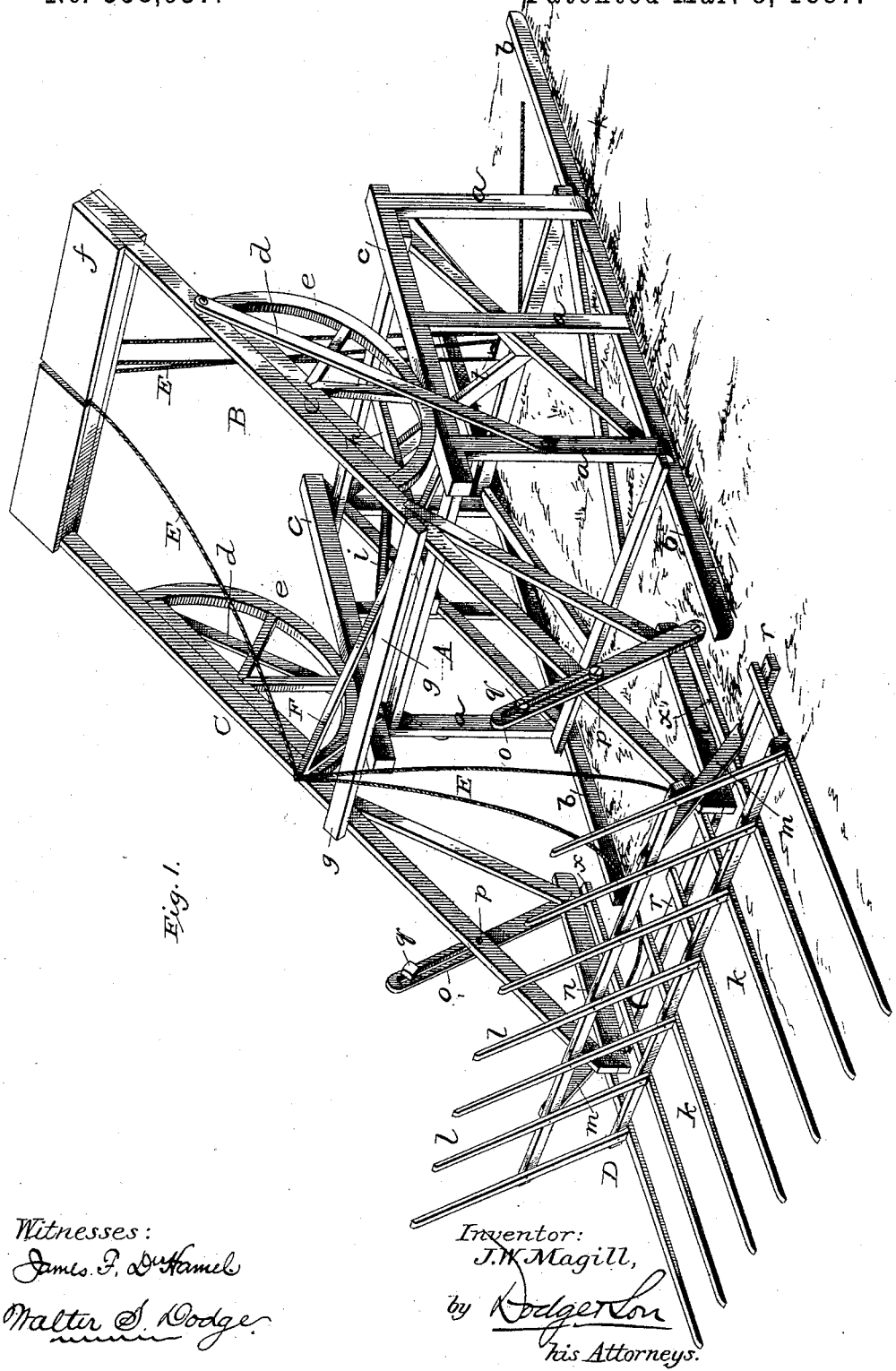

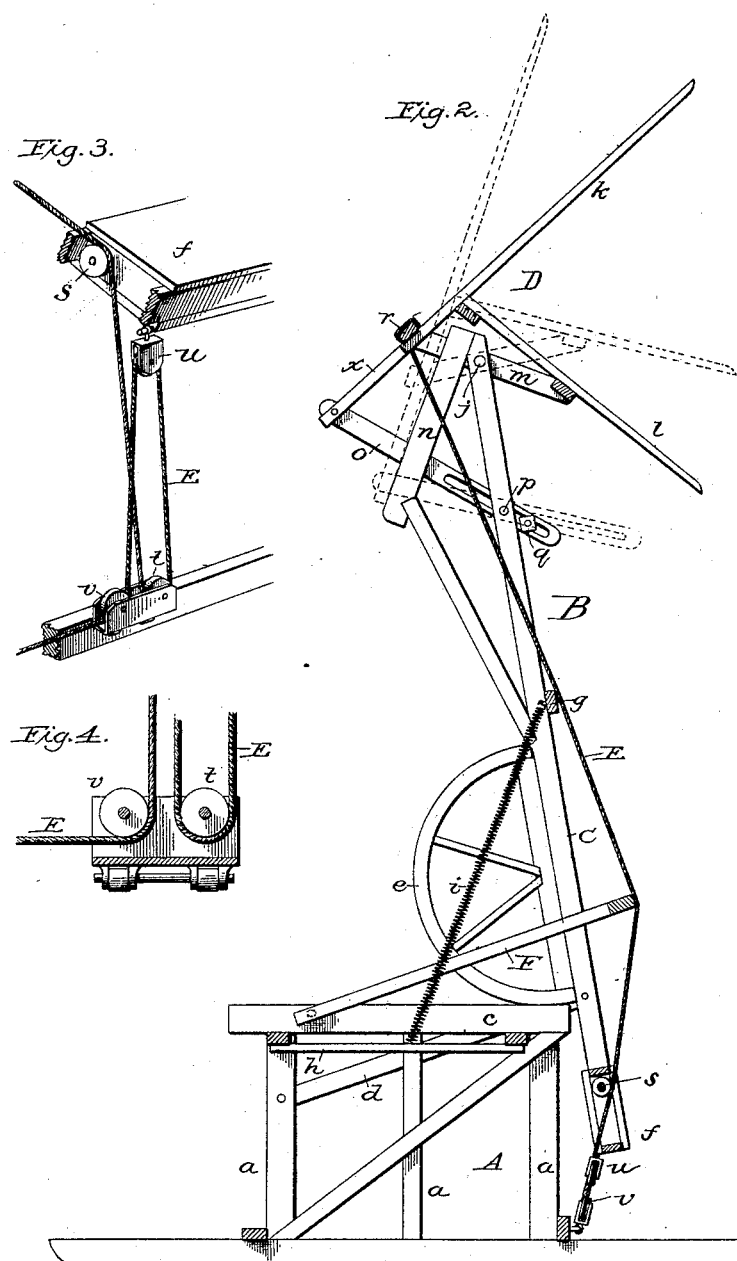

JOHN W. MAGILL, OF SHELBINA, MISSOURI.

HAY-STACKER.

SPECIFICATION forming part of Letters Patent No. 358,937, dated March 8, 1887.

Application filed July 7, 1886. Serial No. 207,352. (No model.)

*To all whom it may concern:*

Be it known that I, JOHN W. MAGILL, of Shelbina, in the county of Shelby and State of Missouri, have invented certain new and useful Improvements in Hay-Stackers, of which the following is a specification.

My invention relates to a device for stacking hay; and it consists in various features and details hereinafter set forth and claimed.

In the drawings, Figure 1 is a perspective view of the improved stacker; Fig. 2, a vertical central section showing the tilting section elevated and the hay discharged, and Figs. 3 and 4 detail views.

A indicates a frame-work, substantially rectangular in form, which is staked or otherwise firmly secured to the ground near where the hay is to be stacked. The frame-work comprises uprights $a$, sills $b$, and broad flat top rails, $c$, the two upright sides being suitably connected and braced, as shown.

B represents the tilting section, which is pivotally connected to the frame-work A at each side by a pitman or connecting-bar, $d$, as shown in Fig. 1.

Near the rear end of the tilting or tipping section it is provided with semicircular plates or bearings $e$, which rest upon the rails $c$. From this construction it will be seen that the section B may rock or tip upon its bearings $e$ to a substantially vertical position, as shown in Fig. 2, and that any movement of the section will be easy and gradual. The pitmen $d$ serve to prevent the section B from tipping too far in either direction. The side bars or main longitudinal timbers, C, of the section B are connected at their rear ends by a boxing or casing, $f$, which is so constructed as to receive a weight. Generally this weighting will be effected by placing stone in the boxing $f$.

About midway of the length of the bars C the latter are connected by a cross-bar, $g$, and from said cross-bar to a bar, $h$, upon the frame A extends a spring, $i$, as shown in Fig. 2, which serves to keep the front end of the tilting section down. The side bars, C, are extended forward a considerable distance, and carry at their ends the tilting fork D, the latter being pivotally secured to the section B by bolts $j$, as clearly shown in Fig. 2.

The fork D comprises two sets of teeth or fingers, $k$ and $l$, which are arranged substantially at right angles to each other, the two sets occupying fixed positions relatively to each other, and braced by diagonal braces $m$, through which the pivot-bolts $j$ pass. Two of the teeth $k$ are extended backward under the tipping section B, to form arms $x$, and when the loaded fork is being raised said arms $x$ rest against the under faces of bars $n$, secured to the side bars, as shown in Fig. 1, and prevent the fork from tipping.

In order to guide the fork in its tipping movements, bars $o$ are pivotally secured to the inner ends of the arms $x$, as shown in Figs. 1 and 2, each of the bars $o$ being slotted longitudinally to receive a guide pin or screw, $p$, secured to the side bar, C.

In order to limit the movement of the fork when tipping to discharge the load, I provide the bars $o$ with angular stops $q$, which, striking upon the upper faces of the side bars, C, limit the downward movement of the bars $o$. These stops $q$ are adjustable within the slots of bars $o$, so as to vary the degree of inclination the fork shall occupy in tipping.

The teeth $k$ are connected by a cross-bar, $r$, to which are secured the two branches of a rope, E, the latter, at a point where its two branches unite, being passed through a guide or ring secured upon the upper end of a support, F, pivoted to frame A. The rope-support F prevents the rope E from drawing over the timbers of the framing, and also enables the power to be applied in the most advantageous manner.

From the support F the rope E is carried over a pulley, $s$, in the boxing $f$, downward around a pulley, $t$, near the base of frame A, upward again to the boxing $f$, and around a pulley, $u$, carried thereby, and finally down under a pulley, $v$, in the same casing with pulley $t$, and away to some distant point.

The pulley $u$ is carried in a sheath or casing pivoted to the rear under edge of the boxing $f$, as shown in Fig. 3, while the pulleys $t$ and $v$ are carried in one and the same sheath, which latter is pivotally connected to one of the cross-bars of the frame-work A.

By swiveling or pivoting the pulleys $t$ $u$ $v$ side strain upon the stacker is avoided.

The device, being thus constructed, operates as follows: When in the position shown in Fig. 1, hay is placed upon the fork D, and any suitable power applied to rope E. This causes the tipping section B to rock upon the semicircular bearings e and raise the fork D, as shown in Fig. 2. When in its elevated position, the weight of the hay upon the teeth l causes the fork to tip or rock upon its pivot j, and thus discharge the hay clear outside of the framework.

The arms x may in some cases be omitted, if desired, the slotted bars in such case being secured to the cross-bar r, and serving to limit the rocking or tipping motion of the fork.

Having thus described my invention, what I claim is—

1. In a hay loader or stacker, the combination, with the stationary frame-work, of a tipping section mounted upon the latter and provided with semicircular bearings e, substantially as shown.

2. In a hay-stacker, the combination, with a frame-work, A, of a tipping section, B, provided with semicircular bearings e and links or pitmen d, connecting the frames A and B.

3. In a hay-stacker, the combination, with the frame A and tipping section B, of a fork, D, pivoted to the latter, and slotted bars secured to the fork and engaging with the tipping section, as shown and described.

4. In a hay-stacker, in combination with frame A and tipping section B, fork D, pivotally secured to the latter, bars o, secured to the fork, and stops q, adjustable upon the bars o, as and for the purpose set forth.

5. In a hay-stacker, in combination with frame A and tipping section B, a cord or rope for tipping said section B, and a pivoted rope-support, F, arranged substantially as shown.

6. In a hay-stacker, in combination with frame A and section B, pulley u, secured to tipping section B, pulleys t v, secured to frame A, and rope E, passing about the pulleys t u v, substantially as shown.

7. In combination with frame A, tipping section B, mounted thereupon, and a fork, D, pivoted to the end of the section B and comprising two sets of arms, k and l, fixed relatively to each other, the fork being adapted to automatically tip or rock bodily to discharge the load as the tipping section is elevated, all substantially as described and shown.

JOHN W. MAGILL.

Witnesses:
W. R. HALLOWAY,
J. M. DEAN.